United States Patent
Bray et al.

(10) Patent No.: US 9,791,075 B2
(45) Date of Patent: Oct. 17, 2017

(54) ROTARY FRICTION WELDING

(71) Applicant: ROLLS-ROYCE PLC, London (GB)

(72) Inventors: Simon Edward Bray, Derby (GB); Andrew Robert Walpole, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/816,842

(22) Filed: Aug. 3, 2015

(65) Prior Publication Data
US 2016/0039043 A1    Feb. 11, 2016

(30) Foreign Application Priority Data
Aug. 6, 2014 (GB) .................................. 1413923.2

(51) Int. Cl.
*B23K 33/00* (2006.01)
*F16L 13/02* (2006.01)
(Continued)

(52) U.S. Cl.
CPC .............. *F16L 13/02* (2013.01); *B23K 20/12* (2013.01); *B23K 20/129* (2013.01);
(Continued)

(58) Field of Classification Search
CPC .............. Y10T 403/477; B23K 20/122; B23K 20/1225; B23K 20/127; B23K 20/129; B23K 2201/06; B23K 33/006
See application file for complete search history.

(56) References Cited

U.S. PATENT DOCUMENTS 3,268,248 A * 8/1966 Chambers ............ B23K 33/004
                                                          228/135
3,777,360 A    12/1973 Welch
(Continued)

FOREIGN PATENT DOCUMENTS

| FR | 2 992 880 A1 | 1/2014 |
| GB | 1 361 436 A | 7/1974 |

(Continued)

OTHER PUBLICATIONS

Jan. 12, 2015 Search Report issued in British Application No. 1413923.2.
Jan. 13, 2016 Search Report issued in European Patent Application No. 15179509.
(Continued)

*Primary Examiner* — Jonathan Masinick
(74) *Attorney, Agent, or Firm* — Oliff PLC

(57) ABSTRACT

A method providing a first tubular workpiece having a first weld surface at an end thereof, and a second tubular workpiece having a second weld surface at an end thereof; aligning the workpieces on a common axis with the weld surfaces facing each other, rotating one workpiece about the axis relative to the other workpiece, and engaging the first and second weld surfaces such that the rotation raises the temperature at the weld surfaces to create a weld interface; and ceasing the rotation and allowing the weld interface to cool to weld the workpieces together at the interface. The first weld surface is an apex region of an annular projection at the end of the first workpiece, on a longitudinal section through the aligned workpieces the annular projection having a profile in which radially inner and outer side surfaces of the annular projection taper towards the apex region.

11 Claims, 5 Drawing Sheets

(51) Int. Cl.
*B23K 20/12* (2006.01)
*B23K 101/06* (2006.01)

(52) U.S. Cl.
CPC ........ *B23K 33/006* (2013.01); *B23K 2201/06* (2013.01); *F16L 13/0281* (2013.01)

(56) References Cited

U.S. PATENT DOCUMENTS

| | | | | |
|---|---|---|---|---|
| 4,724,975 | A | * | 2/1988 | Leventry .............. B23K 33/006 220/4.12 |
| 2005/0156011 | A1 | * | 7/2005 | Brownell ........... B23K 20/1205 228/112.1 |
| 2009/0314823 | A1 | * | 12/2009 | Bray ................. B23K 20/1205 228/112.1 |
| 2011/0316271 | A1 | * | 12/2011 | Lalam .................. B23K 9/0282 285/179 |
| 2014/0016994 | A1 | * | 1/2014 | Gani .................... B23K 20/129 403/270 |

FOREIGN PATENT DOCUMENTS

| | | |
|---|---|---|
| JP | S5662687 A | 5/1981 |
| JP | S6397381 A | 4/1988 |
| JP | 2000301364 A | 10/2000 |

OTHER PUBLICATIONS

Jun. 22 Office Action issued in Euopean Application No. 15 179 509.3.

\* cited by examiner (a)

(b)

(a)

(b)

ROTARY FRICTION WELDING

CROSS-REFERENCE TO RELATED APPLICATIONS

This application is based upon and claims the benefit of priority from British Patent Application Number 1413923.2 filed 6 Aug. 2014, the entire contents of which are incorporated by reference.

BACKGROUND

1. Field of the Disclosure

The present disclosure relates to a rotary friction welding process.

2. Description of the Related Art

Rotary friction welding is the process for welding together two bodies or workpieces by converting mechanical energy to heat energy by the friction between the engaging weld surfaces of the two workpieces. The process involves effecting relative rotation between the two workpieces while the weld surfaces remain in engagement with each other.

For example, in inertia friction welding one of two coaxial workpieces is attached to a flywheel, rotated to a predetermined speed and then driven against the second workpiece using thrust supplied by the welding machine. A fixed amount of stored energy in the flywheel (proportional to $rpm^2.I$, where rpm is the flywheel's predetermined speed and I is its rotational inertia) is thereby converted to heat by friction at the interface of the engaging weld surfaces, which bonds the workpieces together.

The initial contact between the weld surfaces produces a conditioning period in which friction raises the temperature at the interface. This is followed by upsetting when the temperature reaches a high enough level such that softening/melting of the workpiece material allows the workpieces to be pushed together, with liquid or quasi-liquid material being expelled sideways from a plasticised zone at the interface.

In its application to turbine hardware, such as the joining of compressor discs, the weld geometry is tubular. When using rotary friction welding to join two tubes together, it is standard practice for the starting weld surfaces to be flat and parallel end faces of the tubes.

However, variations in contact conditions at the weld surfaces lead to variability in the welding process upset. For example, due to machining tolerances, residual stress distortions etc., the weld surfaces are generally not completely flat, which leads to non-axisymmetric contact, producing local hotspots at the weld interface. At large diameters in thin walled components such as turbine compressor discs, such non-uniform contact can be exaggerated. This results in variability in the efficiency of local heating during the conditioning period and hence variation in the conditioning duration. In the fixed-energy inertia welding process this leads to variation in total upset and hence fitness for purpose either through reduced integrity at low upset (interface contaminants not fully expelled) or component fit at low or high upset.

Variations in contact conditions at the weld surfaces can also reduce control of defect expulsion. For example, the material may be expelled non-axisymmetrically from the interfacial plasticised zone, with a result that interface contaminants may not be fully removed from all parts of the weld. Accordingly, assumptions about flow and contaminant expulsion may be incorrect, leading to sub-optimal process and component design, or a low integrity product with a reduced life.

As well as non-flat weld surfaces, contact condition variability may also be produced by workpiece diameter mismatch, workpiece eccentricity and lack of workpiece coaxiality. In addition, where a welding machine has a limited thrust capability this can compromise the preferred contact pressure for a given tubular wall thickness.

OBJECTS AND SUMMARY

It would be desirable to provide a rotary friction welding process which addresses at least the above problems.

Accordingly, in a first aspect the present disclosure provides a rotary friction welding process including:

providing a first tubular workpiece having a first weld surface at an end thereof, and a second tubular workpiece having a second weld surface at an end thereof, aligning the workpieces on a common axis with the weld surfaces facing each other, rotating one workpiece about the axis relative to the other workpiece, and engaging the first and second weld surfaces such that the rotation raises the temperature at the weld surfaces to create a weld interface, and ceasing the rotation and allowing the weld interface to cool to weld the workpieces together at the interface;

wherein the first weld surface is an apex region of an annular projection at the end of the first workpiece, on a longitudinal section through the aligned workpieces the annular projection having a profile in which radially inner and outer side surfaces of the annular projection taper towards the apex region.

Advantageously, by providing such an apex region, variability in the initial contact conditions at the weld surfaces can be reduced, leading to a more predictable conditioning period. As a result, upset variability can be reduced and defect expulsion improved. The process can thus be better optimised, for example allowing the amount of upset used to produce a given joint to be reduced, which can decrease material wastage through flash and/or decrease the amount of energy needed to produce the joint.

More particularly, the apex region can lead to a smaller variation in pressure between inner and outer sides of the tube wall. The pressure at the weld interface is thus more uniform. Further, local hotspots can be reduced or eliminated and less time may be required to form a plasticised interface zone. In addition, the sideways (i.e. radial) distance for defects to be rejected into flash can be reduced, and detrimental effects of workpiece diameter mismatch, eccentricity and lack of coaxiality can be reduced or eliminated. In addition, an increased pressure during contact can be achieved, thereby promoting an initial rapid expulsion of interface contaminants and improving sealing of the weld against re-introduction of contaminants.

In a second aspect, the present disclosure provides the first tubular workpiece of the process of the first aspect. For example, a tubular workpiece can be provided for use in a rotary friction welding process, the workpiece having a weld surface for engagement, on welding, with a corresponding weld surface of a further tubular workpiece, the weld surface being an apex region of an annular projection at the end of the workpiece, on a longitudinal section through the workpiece the annular projection having a profile in which radially inner and outer side surfaces of the annular projection taper towards the apex region.

Optional features of the disclosure will now be set out. These are applicable singly or in any combination with any aspect of the disclosure.

The process may be an inertia, direct drive, or hybrid rotary friction welding process.

The tubular workpieces may be hollow cylindrical workpieces. However, the workpieces may have more complex shapes. In the case of a more complex shaped workpiece, typically the portion of the workpiece at the end having the weld surface is a hollow cylinder shape.

The width of the apex region on the longitudinal section may be less than the width of the second weld surface on the longitudinal section. For example, for consistency with typical manufacturing tolerances, the width of the apex region on the longitudinal section may be at least 0.6 mm less than the width of the second weld surface on the longitudinal section, and preferably may be at least 0.7 mm less. The benefit of the apex region diminishes the wider the region becomes, and thus the width of the apex region on the longitudinal section may be less than 70%, and preferably less than 50%, of the wall thickness of the first workpiece. On the other hand very narrow apex regions can be susceptible to sudden collapse/failure on engagement of the weld surfaces, and thus the width of the apex region on the longitudinal section may be at least 1 mm.

The apex region can be a flat surface. For example, it can be perpendicular to or at an angle to the axis. Another option, however, is for the apex region to be a convex surface, in which case it can be a smoothly convex surface or a facetted surface.

The side surfaces of the annular projection may be angled by at least 5° to the radial direction and/or at most 20° to the radial direction. The angle of the side surfaces to the radial direction (which may be the angle labeled φ in FIG. 3(b)) may be, for example, in the range of from 1° to 60°, for example 2° to 50°, for example 3° to 40°, for example 4° to 30°, for example 5° to 20°, for example on the order of 10° or 15°.

The second weld surface may be a second apex region of a second annular projection at the end of the second workpiece, on a longitudinal section through the aligned workpieces the second annular projection having a profile in which radially inner and outer side surfaces of the second annular projection taper towards the second apex region. Optional features of the first annular projection can apply to the second annular projection. For example, the width of the second apex region on the longitudinal section may be at most 70% and/or at least 1 mm. The second apex region can be a flat surface or a convex surface. The side surfaces of the second annular projection may be angled by at least 5° to the radial direction and/or at most 20° to the radial direction. When the workpieces are formed of dissimilar materials, the shapes of the first and second apex regions can be adjusted accordingly. For example, a workpiece formed of softer material than the other workpiece may have larger side surface angles. In this way, due to the higher rate of upset of the softer workpiece, a better weld interface shape and position can be maintained.

The or each annular projection may be formed by machining the respective workpiece or by build-up of a suitable material by a material addition process.

BRIEF DESCRIPTION OF THE DRAWINGS

Embodiments of the disclosure will now be described by way of example with reference to the accompanying drawings in which.

DETAILED DESCRIPTION OF EMBODIMENTS

Figure 1:
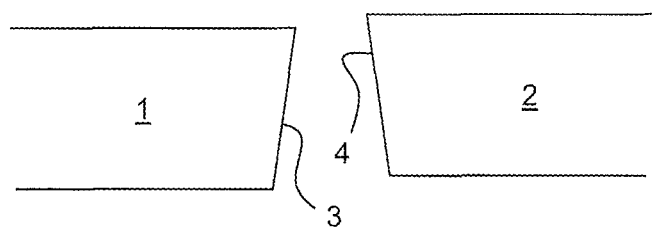
FIG. 1 shows schematically a longitudinal cross-section through a pair of conventional tubular workpieces (a) in readiness to undergo rotary friction welding, and (b) after being brought together so that their weld surfaces make contact.
Figure 1:
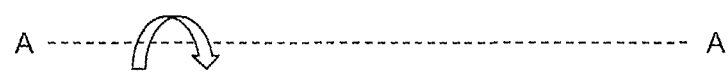
Figure 1:
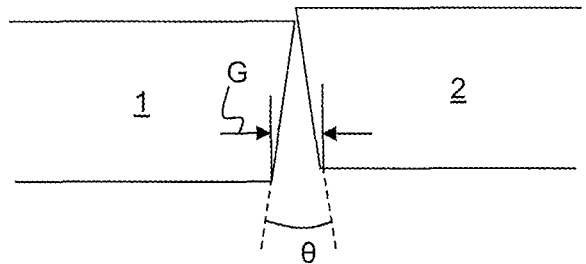
Figure 1:

FIG. 1(a) shows schematically a longitudinal cross-section through a pair of conventional tubular workpieces 1, 2 in readiness to undergo rotary friction welding. The workpieces are aligned on a common axis A-A and have respective end faces forming weld surfaces 3, 4.

The left hand workpiece 1 is attached to a flywheel or drive system which is rotated at a predetermined speed, indicated by the solid arrow.

As shown in FIG. 1(b), the workpieces are brought together so that the weld surfaces 3, 4 make contact. However, due to manufacturing tolerances, the weld surfaces are not completely flat, and also not perpendicular to the axis A-A. In addition, the workpieces exhibit a diameter mismatch, eccentricities and/or axis misalignment. Accordingly, the weld surfaces meet at an angle θ, and have an initial point of contact which is offset to the outer edge of the workpiece walls, producing a large gap G between the weld surfaces at their inner diameters. During the conditioning period, this results in a localised high pressure and hotspot at the point of contact.

Figure 2:
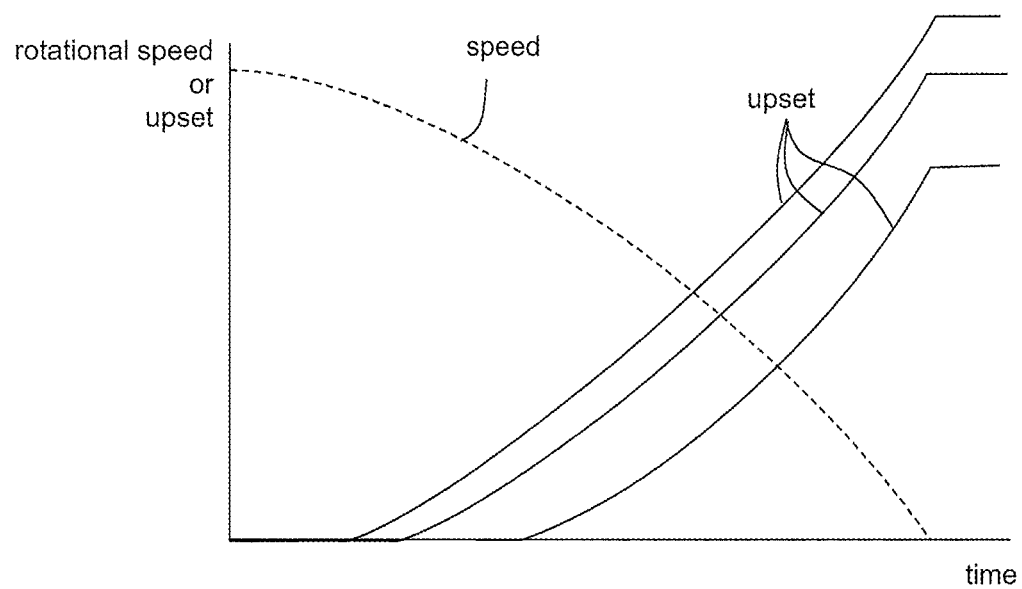
FIG. 2 shows schematically plots of flywheel speed and workpiece upset against time for joining three nominally-identical conventional workpiece pairs.

FIG. 2 shows schematically plots of flywheel speed and workpiece upset against time for joining three nominally-identical conventional workpiece pairs. Due to variation in the contact conditions, the initial conditioning period where the upset is zero is highly variable, leading to significant differences in the final upsets achieved with the different pairs. Also, defect expulsion can be poorly controlled, particularly as the initial point of contact is offset to the outer edge of the weld surfaces.

FIG. 3(a) shows schematically a longitudinal cross-section through a pair of tubular workpieces 11, 12 according to an embodiment of the present disclosure. Again the workpieces are aligned on a common axis A-A, and are in readiness to undergo rotary friction welding, with the left hand workpiece 11 being attached to the flywheel. In this case, however, the end faces of the workpieces have respective annular projections 13, 14, at their end faces, with the outer 17, 19 and inner 18, 20 side faces of the projections tapering towards respective apex regions 15, 16 which form the weld surfaces.

Figure 3:
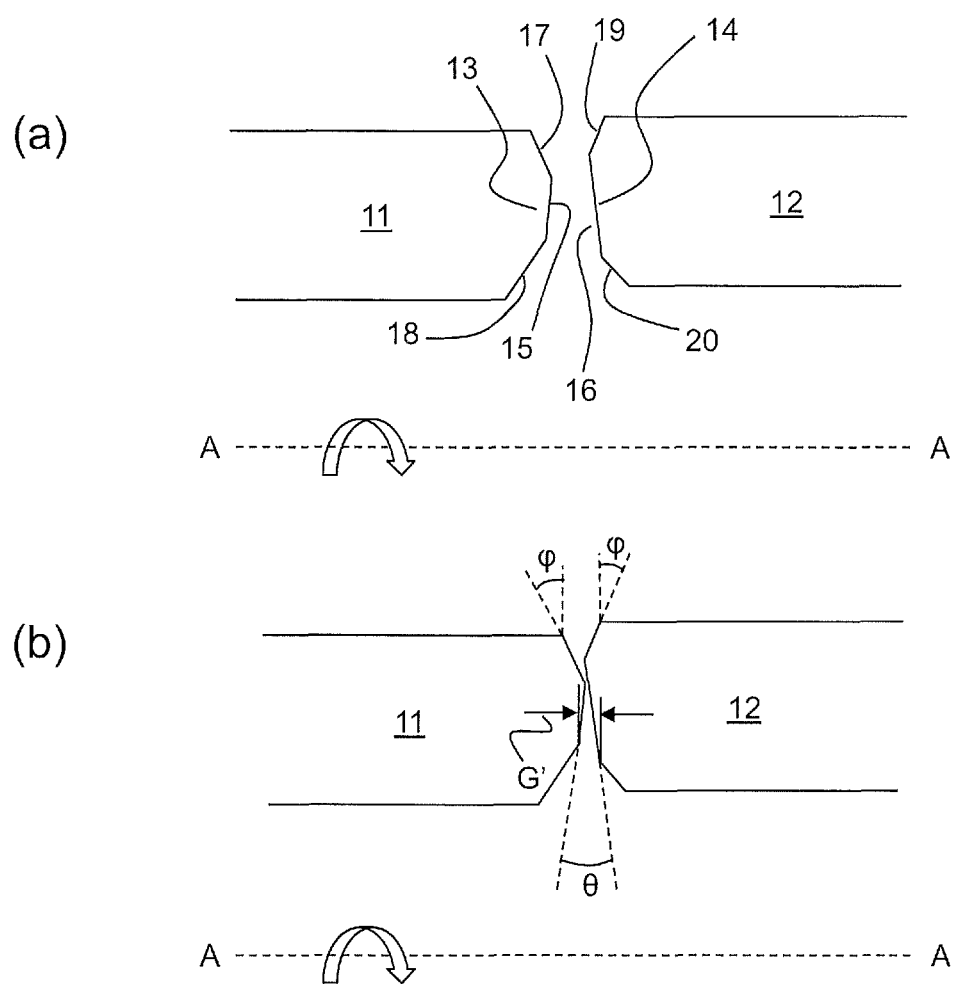
FIG. 3 shows schematically a longitudinal cross-section through a pair of tubular workpieces according to an embodiment of the present disclosure (a) in readiness to undergo rotary friction welding, and (b) after being brought together so that their weld surfaces make contact.
Figure 4:
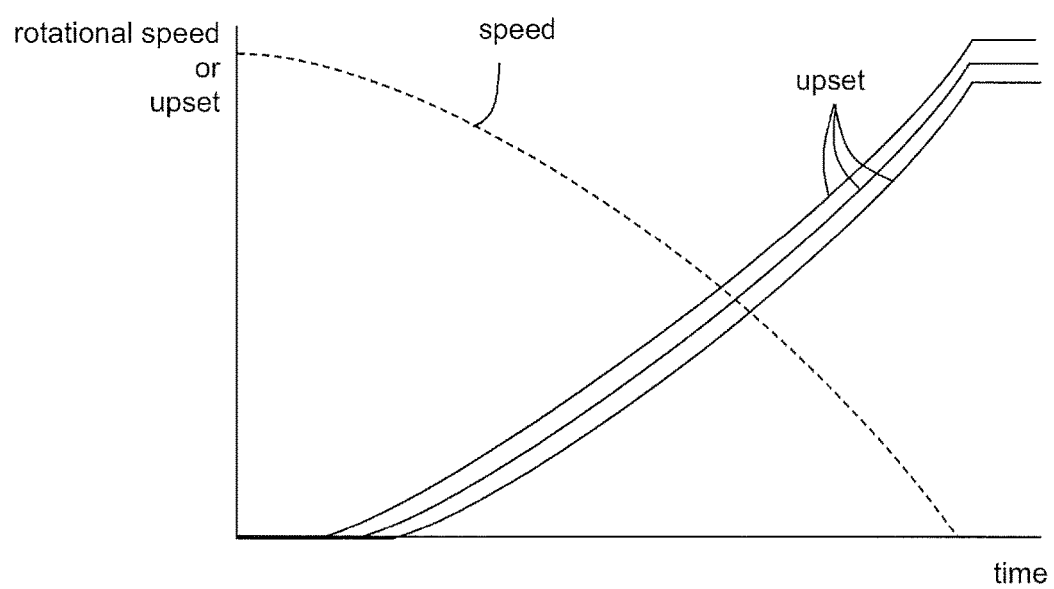
FIG. 4 shows schematically plots of flywheel speed and workpiece upset against time for joining three nominally-identical workpiece pairs according to an embodiment of the present disclosure.

Due to manufacturing tolerances, the weld surfaces 15, 16 may still not be completely flat, and not perpendicular to the axis A-A. In addition, the workpieces may still exhibit a diameter mismatch, eccentricities and/or axis misalignment. Thus, as shown in FIG. 3(*b*), the weld surfaces still meet at an angle θ. However, by virtue of the annular projection on at least one of the workpieces, the weld surfaces have an initial point of contact that is more centrally located relative to the workpiece walls, and a reduced gap G' between the weld surfaces 15, 16 at their inner diameters. Accordingly, control over the conditioning period is improved, reducing variability in the final offset that can be achieved. This is illustrated in FIG. 4, which shows schematically plots of flywheel speed and workpiece upset against time for joining three nominally-identical workpiece pairs according to an embodiment of the present disclosure. The upsets of FIG. 4 can be compared with those of FIG. 2.

As shown in FIG. 3, the width of the left hand apex region 15 is narrower than that of the right hand weld surface 16. Typical workpiece diameters are controlled to +/−0.05 mm, and typical welding machine concentricity is controlled to within about 0.25 mm. In view of these tolerances, the width of the narrow apex region is preferably at least about 0.6 or 0.7 mm less than the width of the facing weld surface. This ensures that the narrow apex region can always be made to contact the facing weld surface when brought into engagement, thus controlling the initial contact condition.

The benefit of the apex regions diminishes the wider the regions become relative to the wall thickness of the tubular workpieces. On the other hand, very narrow apex regions are at risk of collapse/failure due to plastic yielding. Accordingly, the width of the narrowest apex region is preferably set such that the initial engagement force of the workpieces at the weld interface produces a contact pressure which is not greater than the respective plastic yield strengths of the materials of the workpieces. For typical workpieces and friction welding equipment, a reasonable minimum width of the apex region is 1 mm. The maximum width of the apex region may be no more than 70% and preferably no more than 60 or 50% of the wall thickness of the respective workpiece. The side surfaces 17, 18, 19, 20 of the annular projections 13, 14 may be angled φ by at least 5° to the radial direction and/or at most 20° to the radial direction. These dimensions are consistent with controlling the conditioning period, and controlling defect expulsion. In particular, the annular projections promote efficient rejection of defects into flash during upsetting as expelled material does not have to travel laterally great distances in order to be removed from the weld interface. Further, such dimensions can help to create uniform isotherms at the contact area.

The shape of the apex regions can also be adjusted, as necessary. For example, in FIG. 3, the apex regions 15, 16 are shown with flat surfaces. Such surfaces may be perpendicular to the axis A-A, or tilted from the perpendicular. Another option, however, is to provide a convex apex region, which can be a smooth surface or a facetted surface.

Figure 5:
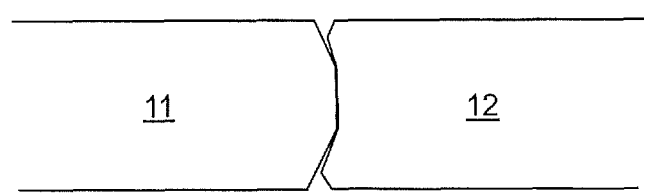
FIG. 5 shows a relatively hard workpiece (at left) and relatively soft workpiece (at right) (a) with equal side surface angles and a resulting non-optimal weld interface shape and position, and (b) with non-equal side surface angles and a resulting improved weld interface shape and position.
Figure 5:
Figure 5:
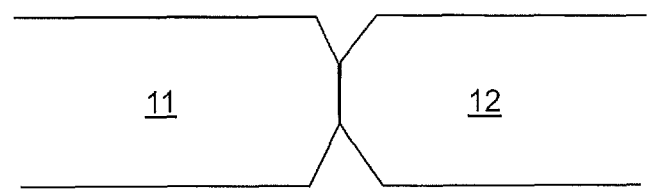
Figure 5:
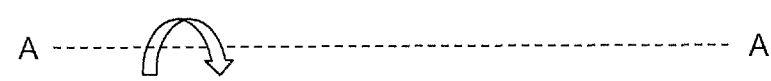

The shape of the apex regions can also be optimised for joining dissimilar materials. For example, if one workpiece is formed of a softer material than the other workpiece, then the relative widths of the apex regions 15, 16 and/or the relative sizes of the angles of the side surfaces 17, 18, 19, 20 may be adjusted to compensate. In particular, a workpiece formed of softer material may have larger side surface angles so that, due to its higher rate of upset, a more optimal weld interface shape and position is maintained. This is illustrated in FIG. 5 for a relatively hard workpiece 11 and relatively soft workpiece 12 (a) with the workpieces having equal side surface angles and a resulting non-optimal weld interface shape and position, and (b) with the softer workpiece having larger side surface angles and a resulting improved weld interface shape and position.

While the disclosure has been described in conjunction with the exemplary embodiments described above, many equivalent modifications and variations will be apparent to those skilled in the art when given this disclosure. For example, only one of the workpieces 11, 12 shown in FIG. 3 may have an annular projection. Accordingly, the exemplary embodiments of the disclosure set forth above are considered to be illustrative and not limiting. Various changes to the described embodiments may be made without departing from the scope of the invention.

We claim:

1. A rotary friction welding process including:
   providing a first tubular workpiece having a first weld surface at an end thereof, and a second tubular workpiece having a second weld surface at an end thereof,
   aligning the workpieces on a common axis with the weld surfaces facing each other, rotating one workpiece about the axis relative to the other workpiece, and engaging the first and second weld surfaces such that the relative movement raises the temperature at the weld surfaces to create a weld interface, and
   ceasing the rotation and allowing the weld interface to cool to weld the workpieces together at the interface;
   wherein the first weld surface is an apex region of an annular projection at the end of the first workpiece, on a cross-section through the aligned workpieces that is perpendicular to the direction of relative movement, the annular projection having a profile in which radially inner and outer side surfaces of the annular projection taper towards the apex region, and
   wherein the angle of the side surfaces in direct contact with the apex region to the radial direction is in a range of from 1° to 40°.

2. The rotary friction welding process according to claim 1, wherein the width of the apex region on the cross-section is less than the width of the second weld surface on the cross-section.

3. The rotary friction welding process according to claim 2, wherein the width of the apex region on the cross-section is at least 0.6 mm less than the width of the second weld surface on the cross-section.

4. The rotary friction welding process according to claim 2, wherein the width of the apex region on the cross-section is less than 70% of the wall thickness of the first workpiece.

5. The rotary friction welding process according to claim 1, wherein the width of the apex region on the cross-section is at least 1 mm.

6. The rotary friction welding process according to claim 1, wherein the apex region is a flat surface.

7. The rotary friction welding process according to claim 1, wherein the apex region is a convex surface.

8. The rotary friction welding process according to claim 1, wherein, on the cross-section, the side surfaces of the annular projection are angled by at least 5° to the radial direction.

9. The rotary friction welding process according to claim 1, wherein, on the cross-section, the side surfaces of the annular projection are angled by at most 20° to the radial direction.

10. The rotary friction welding process according to claim 1, wherein the second weld surface is a second apex region of a second annular projection at the end of the second workpiece, on the cross-section through the aligned workpieces the second annular projection having a profile in which radially inner and outer side surfaces of the second annular projection taper towards the second apex region.

11. A rotary friction welding process including:
providing a first tubular workpiece having a first weld surface at an end thereof, and a second tubular workpiece having a second weld surface at an end thereof,
aligning the workpieces on a common axis with the weld surfaces facing each other, rotating one workpiece about the axis relative to the other workpiece, and engaging the first and second weld surfaces such that the rotation raises the temperature at the weld surfaces to create a weld interface, and
ceasing the rotation and allowing the weld interface to cool to weld the workpieces together at the interface;
wherein the first weld surface is an apex region of an annular projection at the end of the first workpiece, on a longitudinal section through the aligned workpieces the annular projection having a profile in which radially inner and outer side surfaces of the annular projection taper towards the apex region, and
wherein a portion of the apex region of the first workpiece that is in direct contact with the side surface of the first workpiece is in direct contact with a portion of the apex region of the second workpiece that is not in direct contact with a side surface of the second workpiece.

* * * * *